(12) United States Patent
Muddakkagari (10) Patent No.: US 11,487,539 B2
(45) Date of Patent: *Nov. 1, 2022

(54) SYSTEMS AND METHODS FOR AUTOMATING AND MONITORING SOFTWARE DEVELOPMENT OPERATIONS

(71) Applicant: Allstate Insurance Company, Northbrook, IL (US)

(72) Inventor: Naresh Muddakkagari, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/227,502

(22) Filed: Apr. 12, 2021

(65) Prior Publication Data

US 2021/0232393 A1 Jul. 29, 2021

Related U.S. Application Data

(63) Continuation of application No. 16/257,814, filed on Jan. 25, 2019, now Pat. No. 10,983,789.

(51) Int. Cl.
*G06F 9/44* (2018.01)
*G06F 8/77* (2018.01)
(Continued)

(52) U.S. Cl.
CPC ............... *G06F 8/77* (2013.01); *G06F 8/33* (2013.01); *G06F 8/71* (2013.01); *G06F 11/3664* (2013.01);
(Continued)

(58) Field of Classification Search
CPC ..... G06F 8/77; G06F 8/33; G06F 8/71; G06F 16/901; G06F 16/903; G06F 11/3664; G06F 40/14
(Continued)

(56) References Cited

U.S. PATENT DOCUMENTS 7,123,239 B1 * 10/2006 Lapstun ............. H04N 1/32771
382/314
8,224,906 B2 7/2012 Mikkonen et al.
(Continued)

FOREIGN PATENT DOCUMENTS

CN 103067502 A 4/2013
CN 103136101 A 6/2013
(Continued)

OTHER PUBLICATIONS

Title: Collaborative gathering and continuous delivery of DevOps solutions through repositories, author: J Wettinger, et al, published on 2017.*

(Continued)

*Primary Examiner* — Chameli Das
(74) *Attorney, Agent, or Firm* — Dinsmore & Shohl LLP (57) ABSTRACT

Systems and methods are disclosed for automating and monitoring software development operations. The systems may facilitate a user to submit a request to receive information related to a software application development across a development operations (DevOps) pipeline, and to efficiently receive an accurate response to the request. A natural language processing application may use query parameters from the request to form a query. The query may be sent to an artificial intelligence markup language (AIML) interpreter to retrieve the requested information from a database. Alternatively or additionally, the query may be sent to an application associated with an integration of a plurality of DevOps tools in the DevOps pipeline. The application may develop a dynamic response to the request.

20 Claims, 5 Drawing Sheets

(51) Int. Cl.

| | |
|---|---|
| *G06F 8/71* | (2018.01) |
| *G06F 8/33* | (2018.01) |
| *G06F 16/903* | (2019.01) |
| *G06F 16/901* | (2019.01) |
| *G06F 11/36* | (2006.01) |
| *G06F 40/14* | (2020.01) |

(52) U.S. Cl.
CPC .......... *G06F 16/901* (2019.01); *G06F 16/903* (2019.01); *G06F 40/14* (2020.01)

(58) Field of Classification Search
USPC ........................................................ 717/101
See application file for complete search history.

(56) References Cited

U.S. PATENT DOCUMENTS

| | | | |
|---|---|---|---|
| 8,285,652 | B2 | 10/2012 | Biggs et al. |
| 8,346,563 | B1 | 1/2013 | Hjelm et al. |
| 8,819,617 | B1 | 8/2014 | Koenig et al. |
| 8,935,767 | B2 | 1/2015 | Li et al. |
| 9,507,849 | B2 | 11/2016 | Mohajer et al. |
| 9,548,050 | B2 | 1/2017 | Gruber et al. |
| 9,612,821 | B2 | 4/2017 | Iyer et al. |
| 10,013,980 | B2 | 7/2018 | Borsutsky et al. |
| 10,025,567 | B2 | 7/2018 | Balasubramanian et al. |
| 10,061,578 | B2 | 8/2018 | Walsh et al. |
| 2004/0111284 | A1 | 6/2004 | Uijttenbroek |
| 2005/0015350 | A1 | 1/2005 | Foderaro |
| 2008/0016041 | A1* | 1/2008 | Frost ................... G06F 16/258 |
| 2008/0104573 | A1 | 5/2008 | Singla et al. |
| 2009/0300641 | A1* | 12/2009 | Friedman ............ G06F 11/3664 |
| | | | 718/104 |
| 2010/0293524 | A1 | 11/2010 | Ahadian et al. |
| 2013/0152047 | A1 | 6/2013 | Moorthi et al. |
| 2015/0012464 | A1 | 1/2015 | Gilbert |
| 2017/0003948 | A1 | 1/2017 | Iyer et al. |
| 2017/0024733 | A1 | 1/2017 | Purves |
| 2017/0168831 | A1 | 6/2017 | Barrick et al. |
| 2017/0168921 | A1 | 6/2017 | Jhoney et al. |
| 2017/0180487 | A1 | 6/2017 | Frank et al. |
| 2017/0192766 | A1 | 7/2017 | Sogani et al. |
| 2017/0262501 | A1 | 9/2017 | Namboodiri et al. |
| 2018/0053182 | A1 | 2/2018 | Mokhasi |
| 2018/0054524 | A1 | 2/2018 | Dahan et al. |
| 2018/0174055 | A1 | 6/2018 | Tirumale et al. |
| 2018/0225365 | A1 | 8/2018 | Altaf et al. |
| 2019/0095478 | A1 | 3/2019 | Tankersley et al. |
| 2019/0334789 | A1* | 10/2019 | Roche .................. G06K 9/6218 |
| 2019/0370010 | A1* | 12/2019 | Iley ..................... G06F 11/3696 |
| 2020/0110792 | A1* | 4/2020 | Tsabba ................... G06F 40/14 |
| 2020/0218993 | A1* | 7/2020 | Kumar ..................... G06F 8/73 |

FOREIGN PATENT DOCUMENTS

| | | |
|---|---|---|
| KR | 101854576 B1 | 5/2018 |
| WO | 1998/026349 A2 | 6/1998 |

OTHER PUBLICATIONS

Title: Automated inter-artefact traceability establishment for DevOps practice, author: Rubasinghe, published on 2018.*
Title: Building sankie: An ai platform fordevops, author: R Kumar, Published on 2019.*
Title: Securing DevOps: detection of vulnerabilities in CD pipelines, author: C Paule, published on 2018.*
A.F. van Woudenberg "A Chatbot Dialogue Manager" Chatbot and Dialogue Systems: A Hybrid Approach, Open University of the Netherlands Faculty of Management, Science and Technology, Jun. 17, 2014, pp. 1-132.
"Solving Conversational Artificial Intelligence" Semantic Machines http://www.semanticmachines.com/, website visited Jan. 15, 2019, pp. 1-9.
"Pandorabots" Pandorabots: Home https://home.pandorabots.com/home.html, website visited Sep. 11, 2018, pp. 1-5.
"Intelligent bot creation that scales on demand" Microsoft, https://dev.botframework.com/ website visited Jan. 15, 2019, pp. 1-17.
Vinay Nadig "Automate Your Development Activities with Hubot" Icicle Technologies https://www.icicletech.com/blog/automate-your-development-activities-with-hubot, Mar. 5, 2014, pp. 1-8.
Heather Amos "Hey Alexa: Amazon's virtual assistant becomes a personal assistant to software developers" The University of British Columbia: Science, Health & Technology, https://news.ubc.ca/2018/05/24/hey-alexa-amazons-virtual-assistant-becomes-a-personal-assistant-to-software-developers/, May 24, 2018, pp. 1-6.
Otto Vehvilainen "Chatops: Everything About Deployments Right Inside Your Chat" CA Technologies | CA Flowdock http://blog.flowdock.com/2014/11/11/chatops-devops-with-hubot/, Nov. 11, 2014, pp. 1-12.
Imrul Kayes "Agile Testing: Introducing PRAT as a Metric of Testing Quality in Scrum" ACM SIGSOFT Software Engineering Notes vol. 36 No. 2, https://dl.acm.org/citation.cfm?id=1943384, Mar. 2011, pp. 1-5.
Yu Wu et al. "Sequential Matching Network: A New Architecture for Multi-turn Response Selection in Retrieval-Based Chatbots" Cornell University Computer Science > Computation and Language, https://arxiv.org/abs/1612.01627, May 15, 2017, pp. 1-10.
Apr. 20, 2020—(WO) International Search Report & Written Opinion—PCT/US20/014968.
Apr. 20, 2020—(PCT) International Search Report and Written Opinion—App No. PCT/US2020/014968.
Aug. 26, 2020—U.S. Non-Final Office Action—U.S. Appl. No. 16/257,814.
Dec. 8, 2020—U.S. Notice of Allowance—U.S. Appl. No. 16/257,814.
"DevOps: Concepts, practices, tools, benefits and challenges", G Bou Ghantous et al, published in 2017.
"Exploiting devops practices for dependable and secure continuous delivery pipelines", TF Dullmann et al, published on 2018.

* cited by examiner

FIG. 3C

SYSTEMS AND METHODS FOR AUTOMATING AND MONITORING SOFTWARE DEVELOPMENT OPERATIONS

CROSS-REFERENCE TO RELATED APPLICATIONS

This application is a continuation of U.S. patent application Ser. No. 16/257,814 filed Jan. 25, 2019, entitled "Systems and Methods for Automating and Monitoring Software Development Operations," which is herein incorporated by reference in its entirety.

TECHNICAL FIELD

Aspects of the disclosure generally relate to software development platforms. In particular, various aspects of the disclosure include a framework for automating and monitoring software development operations.

BACKGROUND

In an age where customers demand quick updates and instant fixes to software-applications, there is a constant pressure to develop quality software applications as quickly as possible. Compounding this problem is an insufficient harmonization between the processes of planning an appropriate software development, testing the operability for developed software codes, integrating various components of a software-based product, deploying the integrated software-based product in various environments, and monitoring the feedback from customers to further repeat the above-described processes. This has caused unnecessary waste of labor and cost. For example, software developers often find themselves having to re-develop software products if a previously developed software product proves to be unsuccessful, and operations personnel find themselves having to wait too long for software developers to code a product that can be tested. Development operations (DevOps) is an engineering practice that strives to continuously integrate the above-described processes as one process pipeline ("DevOps pipeline"). This has brought some efficiency to software application development by removing some discrepancies between application developers, operations personnel, and customer needs. By decreasing wait times among the various parties involved in the above-described processes, DevOps has resulted in faster time for a software application development to respond to and meet market needs.

However, various parties and non-parties of the DevOps pipeline may often request information on an aspect of a software application development within the DevOps pipeline. These aspects may include the status of a build, the result of a test, or an assessment of a quality metric, among others. It is difficult, and an unnecessary overhead, for a DevOps personnel to have to independently investigate the DevOps pathway to find the appropriate information, particularly when the information changes dynamically through an application's development. Thus, DevOps personnel may desire automated systems that can deliver up-to-date information from the source, and whose accuracy can be verified. There is thus is a need for a system and process that automates and monitors software development operations, allowing a party to seamlessly find answers to queries, without interrupting DevOps engineers.

BRIEF SUMMARY

In light of the foregoing background, the following presents a simplified summary of the present disclosure in order to provide a basic understanding of some aspects of the features described herein. This summary is not an extensive overview of all of the features described herein. The following summary merely presents some concepts in a simplified form as a prelude to the more detailed description provided below.

Systems and methods are described for automating and monitoring software development operations. One example method comprises: receiving, by a first computing device having at least one processor and from a user device of a user via a communication network, a request to receive information concerning a software application development across a development operations (DevOps) pipeline; identifying the software application development and query parameters from the request; forming a query comprising an identifier of the software application development and the query parameters to present to a database associated with the computing device, wherein the database is periodically updated based on information from the DevOps pipeline; receiving, from the database associated with the computing device, a tentative response to the request to receive information; performing a validating operation on the received tentative response based on the formed query; and presenting a validated response to the user device via the communication network.

In accordance with other embodiments of the present disclosure, another example method comprises: receiving, by a first computing device having at least one processor and from a user device of a user via a communication network, a request to receive information concerning a software application development across a development operations (DevOps) pipeline; identifying the software application development and query parameters from the request; forming, using a natural language processing (NLP) application, a query comprising an identifier of the software application development and the query parameters; sending the query to a second computing device, wherein the second computing device is associated with an integration of a plurality of DevOps tools in the DevOps pipeline; receiving, from the second computing device, a response to the request to receive information; presenting the response to the user device via the communication network.

In accordance with other embodiments of the present disclosure, an example system comprises: one or more processors; a natural language processing (NLP) unit; a natural language interpreter unit (e.g., an artificial intelligence markup language (AIML) interpreter unit); an integrating application associated with one or more tools for development operations of a software application; and memory storing computer-executable instructions that, when executed by the one or more processors, cause the system to: receive, from a user device of a user via a communication network, a request to receive information concerning a software application development across a development operations (DevOps) pipeline; identify the software application development and query parameters from the received request; and form, using the NLP unit, a query comprising an identifier of the software application development and one or more query parameters.

The system may further include a calibrator. The memory may store additional computer-executable instructions, which when executed by the one or more processors, cause the system to perform one or more iterations of: performing a search operation for an answer to the query from a database associated with the system, and wherein the natural language interpreter (e.g., AIML interpreter) periodically updates the database using information from one or more software development tools used in the DevOps pipeline;

presenting a tentative answer to the calibrator for validation; and if the tentative answer does not meet a threshold validity metric, reforming the query using the NLP unit. If the tentative answer does meet the threshold validity metric, the memory may store additional computer-executable instructions, which when executed by the one or more processors, would cause the system to develop a validated response to the request to receive information; and displaying the response on a user interface of the user device.

The memory may store additional computer-executable instructions, which when executed by the one or more processors, may cause the system to: receive an answer to the query from an application associated with an integration of a plurality of DevOps tools in the DevOps pipeline; and present the answer as a response to request to receive information a user interface of the user device.

In accordance with other embodiments of the present disclosure, one or more non-transitory computer readable media stores computer-executable instructions. When these computer-executable instructions are executed by a computing device, the computing device may perform one or more of the methods described herein.

Other features and advantages of the disclosure will be apparent from the additional description provided herein.

The methods and systems of the above-referenced embodiments may also include other additional elements, steps, computer-executable instructions, or computer-readable data structures. In this regard, other embodiments are disclosed and claimed herein as well. The details of these and other embodiments are set forth in the accompanying drawings and the description below. Other features and advantages will be apparent from the description, drawings, and claims.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
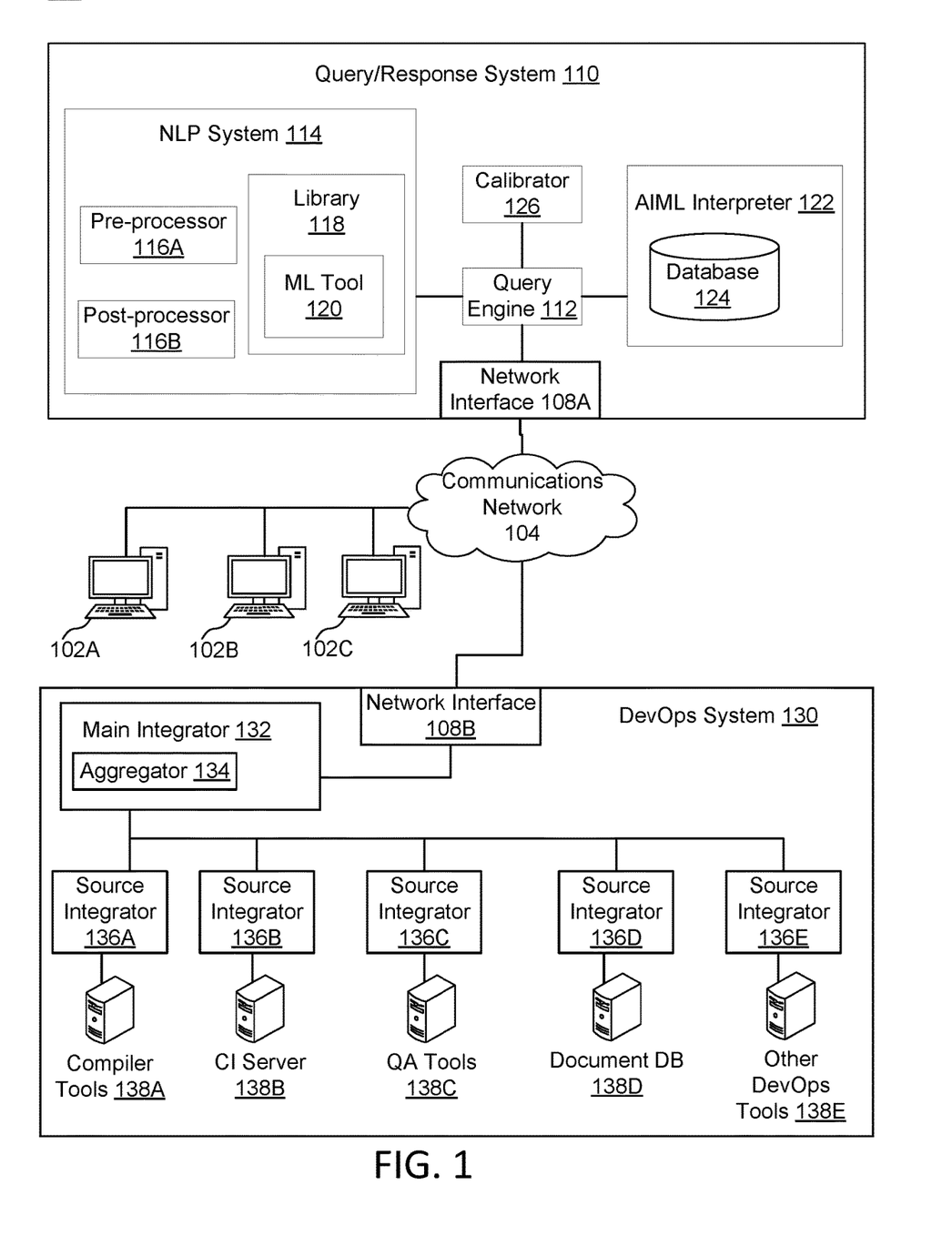
FIG. 1 illustrates a network environment and computing systems that may be used to implement aspects of the disclosure.

FIG. 1 illustrates a block diagram of a network environment and computing systems (e.g., devices, servers, etc.) that may be used to implement aspects of the disclosure. At a high level the network environment 100 may comprise one or more user devices 102A-102C, a query/response system 110, and a development operations (DevOps) system 130 interconnected over a communications network 104.

The communication network 104 may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 104 may use a series of interconnected communication links (e.g., coaxial cables, optical fibers, wireless links, etc.) to facilitate communication between the query response system 110, DevOps system 130, one or more user devices 102A-C, and any external devices or systems. The one or more user devices 102A-102C may include, for example, smart phones, tablets or laptop computers with wired or wireless transceivers, tablets or laptop computers communicatively coupled to other devices with wired or wireless transceivers, and/or any other type of device configured to communicate via a wired or wireless network. As will be described in FIG. 2, the one or more user devices 102A-102C may include at least a processor and a communication interface (e.g., network I/O) to communicate with the query/response system 110 and/or the DevOps system 130. In some implementations, a user device may communicate directly with a component of the DevOps system 130 (e.g., one of the DevOps tools or their source integrators).

Some users may desire to know, via their user devices 102A-102C, a characteristic of a specific aspect of an application's development. For example, a user may wish to know the status of a build, or a quality metric for the build. The devices 102A-102C for such users may be configured to transmit a query over the communication network 104 to the query response system 110. An inquiring user may input its query, via a user device 102A-102C, in natural language, e.g., via text, audio etc. The query response system 110 may be configured to process the natural language input, e.g., via its natural language processor (NLP) 114, and facilitate a response for presentation to the user device.

The communications networks 104 may comprise networks of Internet devices, telephone networks, wireless networks, fiber optic networks, and/or any other desired network. The query/response system 110, DevOps system 130, and/or the one or more user devices 102A-102C may include one or more network interfaces (e.g., network interface 108A for the query/response system 110, network interface 108B for the DevOps system 130, etc.) that comprise circuitry needed to communicate via the communication network 104.

The DevOps system 130 may comprise an interface, such as integrator 132, configured to send information downstream to, and to receive information upstream from, devices and/or applications ("subsystems") via the communications links. These subsystems may help facilitate the DevOps pipeline, which, as described above, may integrate distinct processes involved in application development, e.g., compilation, code management, quality assurance testing, deployment, monitoring feedback, etc. The integrator 132 may help reduce overhead associated with adding individual source integrators. As will be described further below, a aggregator may facilitate parallel responses and normalization of the responses. Thus, the system 130 may allow processes to occur more simultaneously, and by facilitate quicker feedback.

Thus, the DevOps integration system 130 may increase an organization's ability to deliver applications and services at high velocity: evolving and improving products at a faster pace than other organizations using software development and infrastructure management processes.

The integrator 132 may be configured to manage communications among those subsystems, including communications between various DevOps tools 138A-138E, and their corresponding source integrators 136A-136E. The tools may include, for example, compiler tools 138A, continuous integration (CI) servers 138B, quality assurance and testing tools 138C, documentation databases 138D, and any other DevOps tools 138E (e.g., project management tools, install/deployment tools, various testing tools, code management tools, feedback monitoring tools, etc.). The CI server may provide a digital infrastructure (e.g., a pipeline) for integrating the individual DevOps processes. The digital infrastructure may generate processors for building applications, deploying applications, running quality metrics on these applications, receiving assessments and reports, and displaying results (including the assessments and reports) on a dashboard for the user device 102A-102C. CI servers 138B may include scheduling and on-demand functionalities. The DevOps system 130 may provide functionalities for build, deploy, Test, code scan, reporting, monitoring, etc. An example of a CI server 138B is JENKINS™.

Quality assessment and testing tools 138C ("QA tools") may be used to generate code quality or application quality metrics. For example, quality assessment and testing tools 138C may be used to analyze source code, search for defects and bugs, and display results on a dashboard. In some implementations, quality assessment and testing tools 138C may include a unit testing framework or application (e.g., JUnits), a code coverage framework or application (e.g., JaCoCo), and a framework or application for statistically analyzing the code base and learning the vulnerability of the standards of usage (e.g., PMD reports). The statistical analysis may be presented as one or more of a report, spreadsheet, slide, chart, graph, etc. on a dashboard, and may be segregated or divided into many levels. Examples of quality assessment and testing tools 138C may include SONARQUBE™ (formerly SONAR).

Documentation databases 138D may be used to map names for applications and builds with alias names used by each source. For example, a user may input a query request via a user device by citing an application name recognizable to the user, but not to specific DevOps tools. The documentation database 138D may be used, for example, to determine the character string or digital ID that the specific DevOps tools can recognize, and which represents the application. In some aspects, the documentation database may be a non-relational database (e.g., No-SQL database). Formats for data stored may be different from a standard database. MongoDB™ is one example of a documentation database 138D.

Each DevOps tool may be communicatively coupled to a source integrator (e.g., 136A-136E). The source integrators may serve as adapters between the DevOps tools (also referred to as "source(s)") and the main integrator 132. As will be described further below, the source integrators 136A-136E may play a role in translating queries received from user devices 102A-102C (via the query/response system 110) so that the queries are understandable to the source(s), and vice versa.

Furthermore, the main integrator 132 can manage communications between those tools 138A-138E and one or more external networks or devices (e.g., user device 102A-102E). An aggregator 134 may assist in consolidating information received from the different source(s). For example, after a query is received from the query/response system 110, the aggregator may receive the responses from the various source(s) that are relevant for the query, and may consolidate the responses into a unified response. The unified response may be sent to the query response system 110 via the communications network 104. Thus, the DevOps system 130 may communicate with the query response system 110, to facilitate providing relevant information and response to queries.

The query/response system 110 may be configured to perform various functions described herein. For example, the query/response system 110 may receive queries from user devices 102A-102C over the communications network 104, process them to generate executable query requests, determine whether the query solicits a static and/or a dynamic response, invoke the AIML Interpreter 122 and other subsystems for generating the response, communicate with the DevOps system 130 to determine a query response, obtain the data pertaining to the query from various DevOps tools 138A-138E and/or their respective source integrators 136A-136E, and deliver an aggregated and response to the user devices 102A-102C in the desired form, among other functions.

The query/response system 110 may comprise, for example, a query engine 112, a natural language processor (NLP) system 114, an artificial intelligence markup language (AIML) interpreter 122, and a calibrator 126. In some aspects, a natural language interpreter other than an AIML interpreter may be used in alternative to or in addition to AIML interpreter 122. Other tools that perform at least some of the AI processes of the AIML interpreter may include, e.g., RASA Natural Language Understanding (RASA-NLU), Language Understanding Intelligent Service (LUIS), lexical analyzers (lex), etc. As described above, the query/response system 110 may include a network interface 108A that comprise circuitry needed to communicate via the communication network 104. In one implementation the query/response system 110 may receive a query from the one or more user devices 102A-102C via communication network 104. The query may be in a natural language or form that is user-friendly, and may be inputted by the user into his or her user device as text and/or audio. The query may pertain to an ongoing, past, or scheduled application development, and may solicit a response. Upon receiving query, the query engine 112 may function as a main processor or controller to coordinate a response to the received query using the subsystems described herein. For example, as the received query may be in a form readable to the user (e.g., natural language), the query engine may deliver the query to the NLP system 114 for further processing.

The NLP system 114 may include various processors (pre-processor 116A, post-processor 116B), libraries (e.g., library 118), and AI-based systems (e.g., machine learning (ML) tool 120) to analyze and convert natural language to one that could result in a computing system to perform substantive functions (e.g., find a response to the query). Using the pre-processor 116A, the NLP system 114 may rephrase and/or reformat the query for computing systems (e.g., AIML Interpreter 122, DevOps system 130, etc.) to understand. In some aspects, the NLP may also determine whether the query is a dynamic or a static query, as will be discussed further below. Using post-processor 116B, the NLP system 114 may rephrase and/or reformat a proposed response to a query, e.g., so that it may be understandable to a user of the user device 102A-102C that sent the original query. In some aspects, the NLP 114 may assess a proposed response, and upon determining that the proposed response is incorrect, unsatisfactory, or misguided, can facilitate a new response. The NLP system 114 may be guided by a library 118 (e.g., database, look-up tables, repository, etc.) and AI-based tools (e.g., ML tool 120) for various uses in natural language processing, including the undergoing of supervised and unsupervised learning from language data. Together with its library 118, the ML tool 120 may support common NLP tasks, such as tokenization, sentence segmentation, part-of-speech tagging, named entity extraction, chunking, parsing, and coreference resolution. These tasks may be needed to build more advanced text processing services. The ML tool 120 may also include maximum entropy and perceptron based machine learning tools. The NLP system 114 and/or query engine 112 may determine whether a received query solicits a static or dynamic response. For example, a static response may invoke a simple retrieval of information from a local database 124, e.g., of an AIML interpreter 122. A dynamic response may involve invoking the DevOps System 130, which may investigate specific event(s) of an application development from various DevOps tools 138A-138E and their respective source integrators 136A-136E.

The AIML interpreter 122 may be an interface, plug-in, application, and/or external system that receives a processed query from the NLP system 114, and attempts to provide a response. For example, if the query has a static answer, (e.g., "How many builds has a specifically identified application program undertaken?"), the AIML Interpreter 122 may retrieve information for the response from records stored in a local database 124. The AIML interpreter 122 may utilize an artificial intelligence markup language (AIML), which may be used to create artificial intelligent applications. For example, AIML may allow the query/response system 110 to create human interfaces for user devices 102A-102C to receive responses to queries. One such human interface may be a chatter robot (chatbot) that a user may engage with on their user device 102A-102C, e.g., to send queries and receive responses. Furthermore, AIML may allow the implementation of the query response system 110 to be simple to program, easy to understand, and highly maintainable. AIML interpreters may be supported in various programming languages (e.g., Java™, Ruby™, Python™, C++™, C#™, Pascal™, etc.).

The database 124 may be periodically updated based on events taking place across the various DevOps tools 138A-138E for each application development. In some aspects, information from previously generated dynamic responses may be used to further update the database 124 for a given application development. Data stored within database 124 may be associated with specific application developments, and identified by an identifier specific for each application. In some aspects, the AIML interpreter may generate data pertaining to application developments based on stored data, using AIML. Thus, the AIML interpreter 122 may perform an active search based on the knowledge base built using AIML data. If the AIML interpreter 122 does not have a static response to a query, then the query response system 110 may facilitate a dynamic response to the query, as will be described further below. For example, the query response system 110 may communicate with and receive information from the DevOps system 130. In some implementations, the AIML interpreter may be configured to determine responses to queries that are "out-of-bound," e.g., where the responses cannot be found in a local database 124. In such implementations, the AIML interpreter may be more integrated with the DevOps system 130 to be more accessible to real-time event information pertaining to application developments.

The query/response system 110 may further include a calibrator 126. The calibrator 126 may be an interface, plug-in, application, and/or subsystem of the query/response system 110 that can reformat queries if the proposed responses is not a desired response, e.g., whether the response is appropriate. In some aspects, the user device 102A-102C may inform the calibrator that a response is not the desired response to the query. For example, an AIML interpreter may receive a query that appears to solicit a static response. The calibrator may notice that the AIML interpreter does not have the answer to the query in static form, e.g., the query is "out-of-bound." Consequently, the calibrator may reformat the query so that the query/response system 110 may solicit non-static responses (e.g., dynamic responses) for the query. An "out-of-bound" response may signify, for example, that the AIML Interpreter 122 cannot determine or find a static response to a query locally (e.g., using database 124). Thus, the calibrator 126 may assist in calibrating queries after receiving an "out-of-bound" response from the AIML interpreter 122.

Furthermore, if the calibrator 126 does receive a proposed response to a query from the AIML interpreter 122, the calibrator 126 can validate or invalidate the proposed response. For example, the calibrator 126 can decide whether the response from the AIML Interpreter 122 is the best possible response, e.g., if there is a possibility for receiving a better response. The calibrator 126 may decide that there is a possibility for receiving a better response to a query from an external source (e.g., DevOps system 130). The calibrator 126 may also perform similar calibrations as described above for proposed responses received from the external source (e.g., DevOps system 130), before the proposed responses can be validated.

Also or alternatively, the post processor 116B of the NLP system 114 may analyze a proposed response to see if it is an appropriate one for the original query. The determination of whether it is a desired or an appropriate response may be based on user input from user device 102A-102C. The analysis of the proposed response performed by the NLP post processor 116*6* may be subsequent to the analysis of the proposed response performed by the calibrator, e.g., after the proposed response has been validated by the calibrator 126. In some implementations, the NLP post processor 116B may analyze the proposed response prior to or simultaneously with the calibrator 126. The post-processor may reformat or rephrase the query to solicit a better response. Furthermore, like the pre-processor 116A, the post processor 116B may correct a proposed response, e.g., by rephrasing and correcting grammatical mistakes. The post processor 116B may finalize the proposed response (e.g., to a natural language) so that it can be delivered to a user device 102A-102C in a desired format. Like the pre-processor 116A, the post processor 116*6* may reply on the library 118 and any AI-based tools (e.g., ML tool 120) to perform its functionalities.

In some implementations, the query/response system 110 may include additional databases that may store records of events pertaining to an application development. The records may further include metadata that define these events that link them to other events in the DevOps pipeline.

Figure 2:
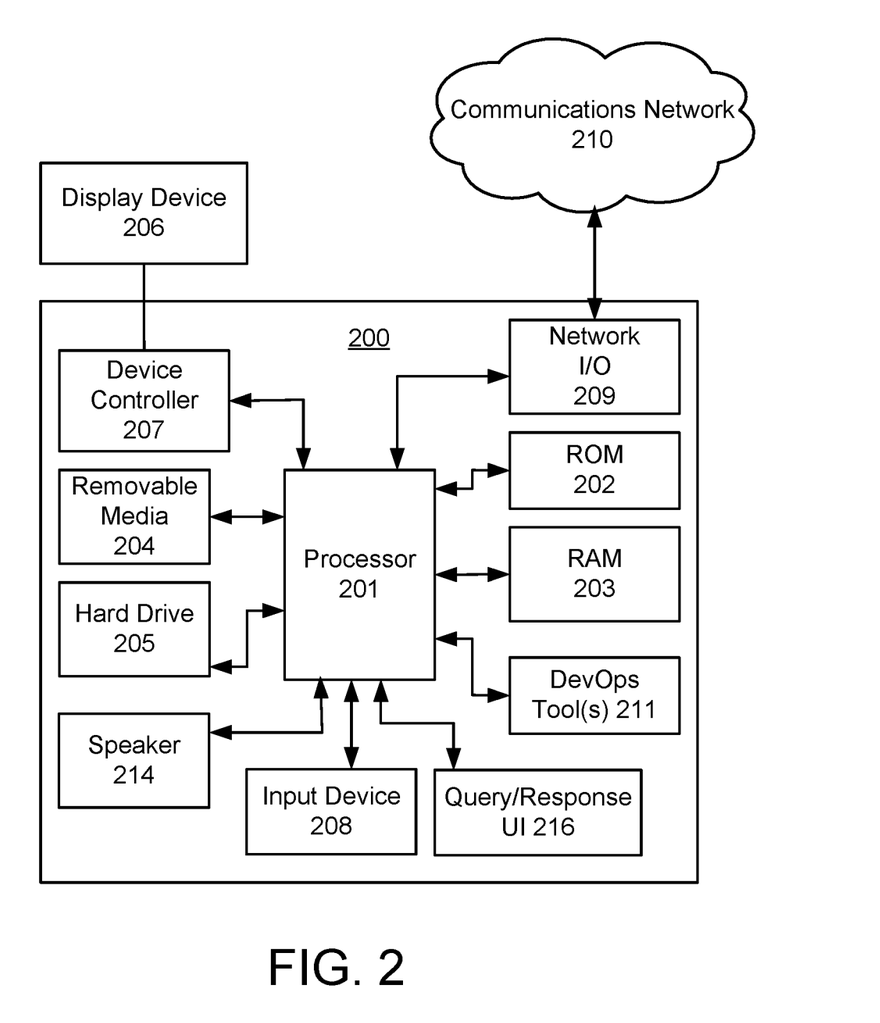
FIG. 2 is a diagram of computing systems that may be used to automate or monitor software development operations (DevOps), according to one or more aspects of the disclosure.

FIG. 2 shows hardware elements of a computing device 200 that may be used to implement any of the computing devices shown in FIG. 1 (e.g., user devices 102A-102C, any devices used in the DevOps pipeline and communicatively coupled to the communications network 104) and any other computing devices discussed herein. For example, the computing device 200 may be one used to perform a function that furthers the development of an application or program. The function may be to compile code, to establish a continuous integration for a DevOps pipeline, the test code and receive quality metrics, to install/deploy code, to receive provide or monitor feedback, etc. A DevOps pipeline may refer to interlinked processes involved in the development of a software application or program, where the processes may be automated or semi-automated with the assistance of the DevOps tools 138A-138E. The computing device 200 may also be one through which a user may send queries or receive responses pertaining to an aspect of an application development, according to methods described herein.

The computing device 200 may comprise one or more processors 201, which may execute instructions of a computer program to perform any of the functions described herein. The instructions may be stored in a read-only memory (ROM) 202, random access memory (RAM) 203, removable media 204 (e.g., a USB drive, a compact disk (CD), a digital versatile disk (DVD)), and/or in any other type of computer-readable medium or memory. Instructions may also be stored in an attached (or internal) hard drive 205 or other types of storage media. The computing device 200 may comprise one or more output devices, such as a display device 206 (e.g., an external or internal display device) and a speaker 214, and may comprise one or more output device controllers 207, such as an image or video processor. One or more user input devices 208 may comprise a remote control, a keyboard, a mouse, a touch screen (which may be integrated with the display device 206), microphone, etc. The computing device 200 may also comprise one or more network interfaces, such as a network input/output (I/O) interface 210 (e.g., a network card) to communicate with the communications network 210. The network I/O interface 210 may be a wired interface (e.g., electrical, RF (via coax), optical (via fiber)), a wireless interface, or a combination of the two. The network I/O interface 210 may comprise a modem configured to communicate via the communications network 210. The communications network 210 may comprise the communications network 104 discussed above, along with any other desired network.

In some implementations, the computing device 200 may include a plug-ins, applications, and/or software for various DevOps tools ("DevOps tool(s)" 211), for a user of the computing device 200 to use in the application development process. For example, the computing device 200 may have a compiler installed to develop code for, and contribute to, an application development process in the DevOps pipeline of the communication device 200.

Furthermore, the computing device 200 may have an application, program, software, and/or plug-in installed that provides a user interface ("Query/Response UI" 216) for the user to submit queries related to an aspect of an application development in the DevOps system 130, and receive response to the queries. The queries may be submitted to, and the responses may be received from, the query/response system 110. Also or alternatively, a user may access the query response UI 216 as a website hosted by the query response system 110. In some aspects, the query/response application 216 may include functionalities (e.g., plug-ins, applications, and/or software) to be able to utilize AIML-based human interfaces (e.g., chatbots) for sending queries and receiving responses for various aspects of an application's development.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Figure 3A:
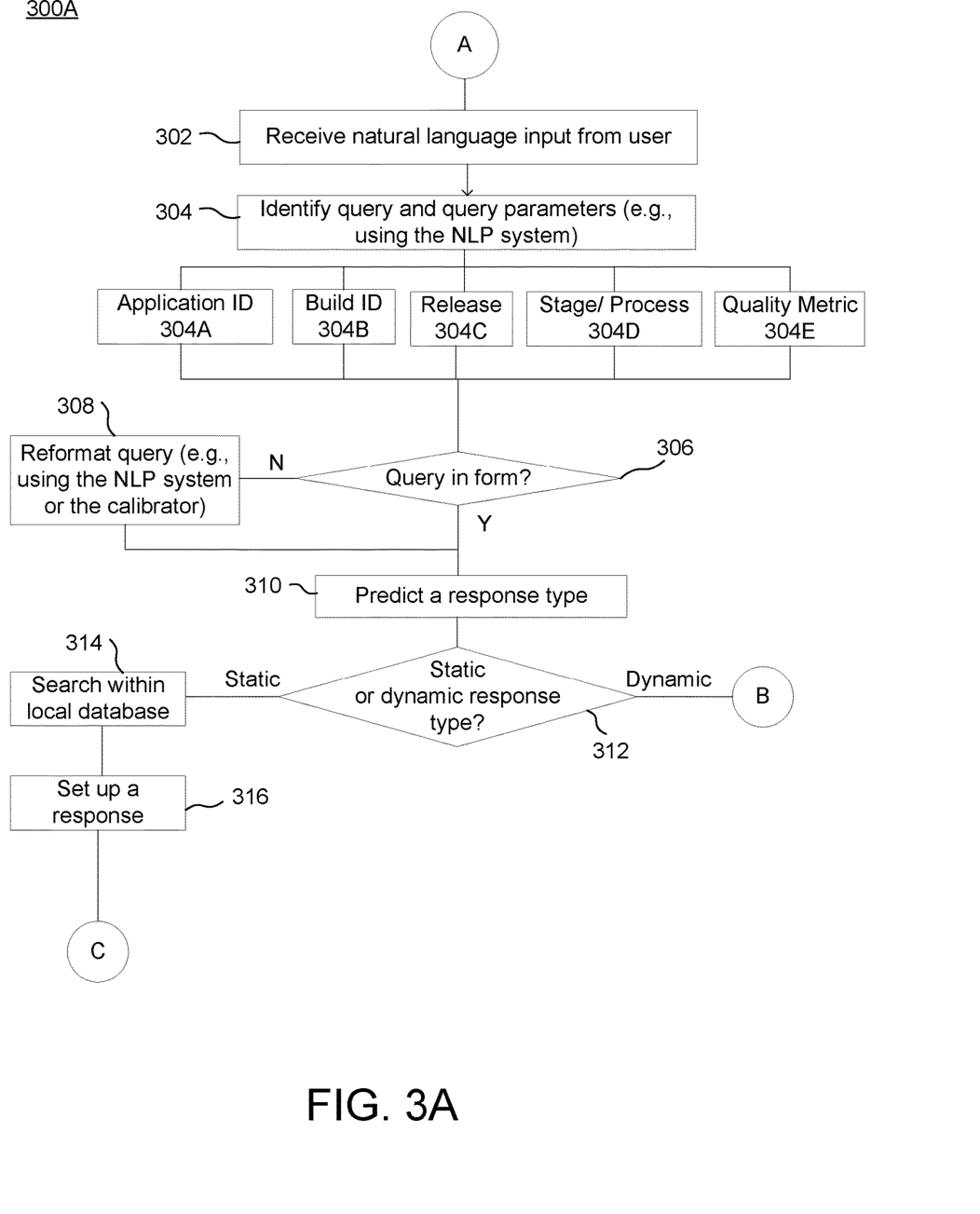
FIGS. 3A-3C illustrate flow diagrams of example methods of automating or monitoring software development operations, according to one or more aspects of the disclosure.
Figure 3B:
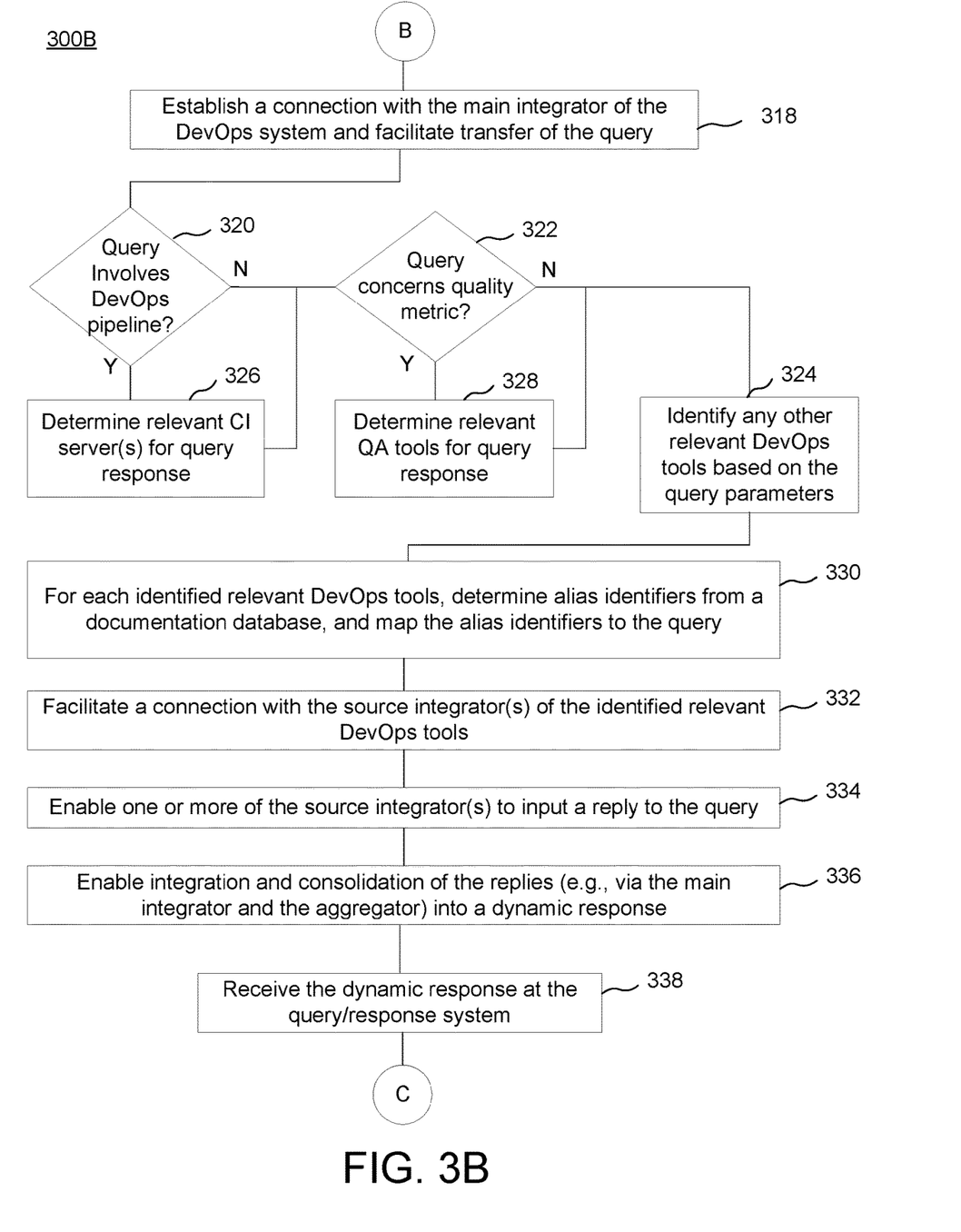
Figure 3C:
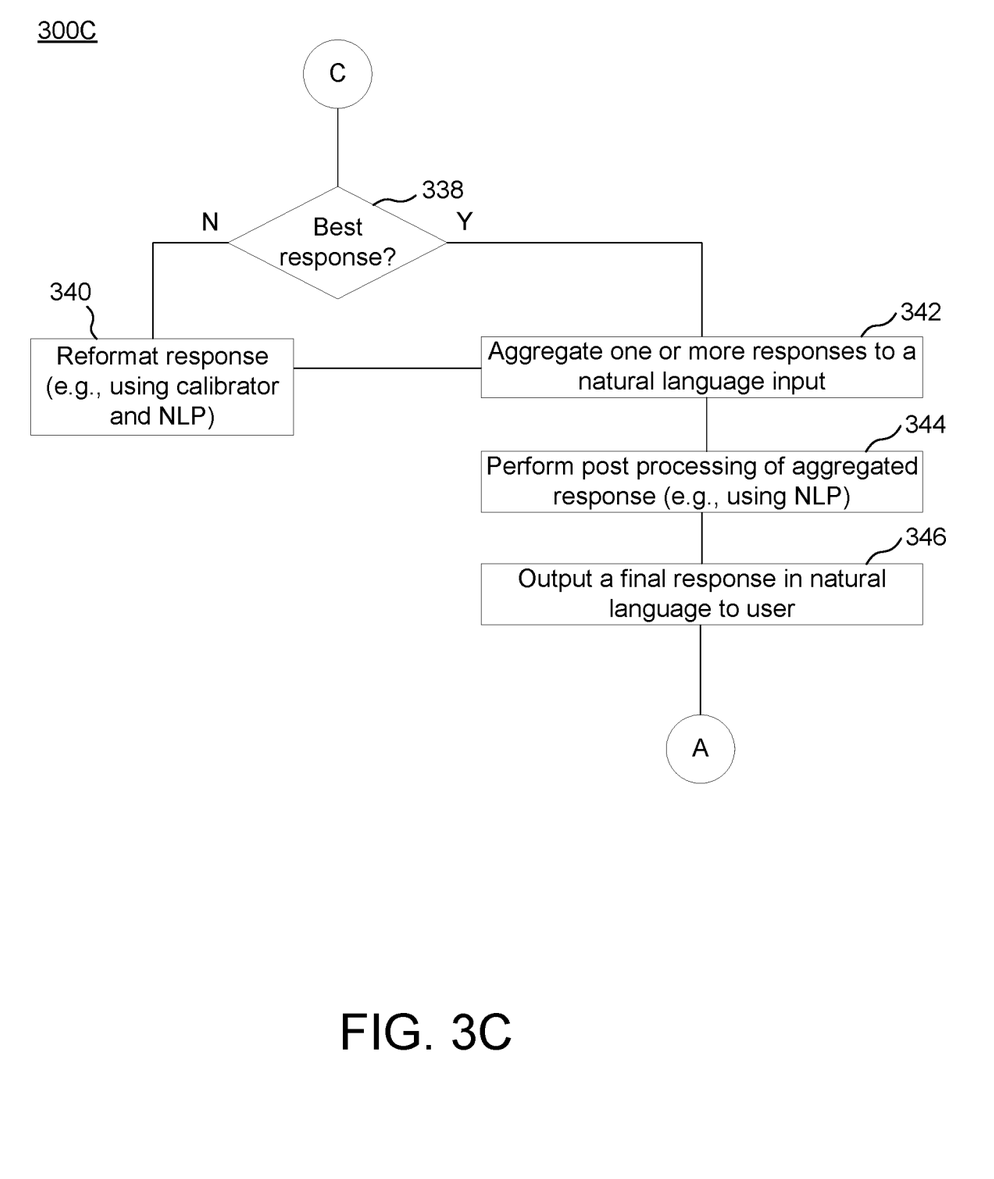

FIGS. 3A-3C illustrate flow diagrams of example methods of automating or monitoring software development operations, according to one or more aspects of the disclosure. Specifically, FIG. 3A is a flow diagram of an exemplary method 300A for an automated determination of a static response to a query on software development operations. FIG. 3B is a flow diagram of an exemplary method 300B for an automated determination of a dynamic response to a query on software development operations. FIG. 3C is a flow diagram of an exemplary method 300C for calibrating and finalizing a response for presentation to a user device. At least some steps of methods 300A-300C may be performed by one or more components of the query/response system 110.

Referring to FIG. 3A, step 302 may include receiving a natural language input from a user. For example, a user who may desire to know the status of a specific aspect of an application development may enter this request on his or her user device 102A-102C. The user device 102A-102C may enable the user to enter the request via a user interface of an application for monitoring the DevOps system 130 (e.g., query/response UI 216). As discussed above, the application may be hosted or controlled by the query response system 110, and/or otherwise facilitate communication between the user device 102A-102C and the query response system 110. The input may be made by the user entering text into the user device, selecting options (e.g., one of many queries for one of many ongoing application developments), by audio (e.g., using speaker 214), or a combination thereof.

At step 304, after receiving the user's input over communications network 104, the query/response system 110 and may identify the input as a query and any one or more query parameters. The input may be directed to the NLP system 114. The NLP system 114 may analyze the input, whether it is a text or audio file, and may use the library 118 of relevant natural language data and other tools (e.g., ML tool 120) to determine whether the input is a query. For example, if the input is an audio file, the NLP system 114 may determine that the ending of a sentence ending in an upward rising tone denotes a query. In another example, if the input is a text file, the NLP system 114 may recognize the input as a query based on a question mark ("?"). The NLP system 114 may recognize parts of the received input that identify an ongoing, planned, or past application development (e.g., "application ID"). The user may input the application ID, an alias, or a descriptive term that the NLP system 114 may determine to be associated with the application ID. (e.g., "TestSoftware 2.0," "Test Software $2^{nd}$ Version", "the 2018 TestSoftware application development").

Furthermore, the NLP system 114 may identify or recognize, from the received input, query parameters, e.g., aspects of the identified application to which the query is directed. The NLP system 114 may recognize, from the input, an aspect of the application development using, for example, words and phrases that denote a specific aspect of an identified application. The aspects may include, but are not limited to, a stage in the application development of the identified application, a specific DevOps tool or role that it serves for the identified application, a quality metric for assessing the development of the application, a component or part of the application, a specific code section or sequence within the application, an overall performance or completion status of the application, a server and/or environment on which the application has been deployed, or a combination thereof.

In order to best direct the query to the appropriate location (e.g., in a database or external system), the NLP system 114 may filter the possibilities to which the query may be directed. In some implementations, the NLP system 114 may identify or recognize query parameters that filter the possibilities based on whether such query parameter is relevant. As the query parameters are associated with aspects of an application, the query parameters may include, but are not limited to, the application ID 304A, a build ID 304B, a release 304C, a stage and/or process in the DevOps pipeline 304D, or a quality metric 304E. For example, the application ID 304A would limit the search for a response to the query to those that pertain to the application represented by the application ID. Likewise, if the query indicates a build ID, the search process would be limited to the build within the application that is represented by the build ID 304B. The build may be a part or segment of the application. For example, the build can be a code sequence that can develop into standalone software, and can be integrated with other builds to form the application. The query may also indicate a release 304C, e.g., a version or project for the build or application. A release may have a proposed time (e.g., day, month, year, etc.) at which a build may be intended to be deployed. Recognizing or identifying a mention of a stage or DevOps process in the query (e.g., Stage 304C) can direct the search for the query response to the identified stage or DevOps process in the application's development. For example, a query of "What is the status of an identified build's deployment?" can direct the search to the installation/deployment phase of the DevOps pipeline for the identified build. In some aspects, there may be multiple and/or concurrent pipelines, and the either the stage/process 304D or another query parameter (not shown) may indicate the pipeline to which the query is being directed to. Stages in an application development, which DevOps helps integrate and minimize wait time for, may include, e.g., the application's design, development, build, quality review, installation, deployment, and/or maintenance.

An identified quality metric 304D can filter the query search to the assessment results for an application for that quality metric (e.g., performance, efficiency, user feedback, glitches, robustness, security, etc.).

If a query parameter is relevant, the NLP system may determine whether any selections and/or sub-selections are made within that query parameter. For example, the query many not only indicate a build or release that may lead to a determination of a build ID 304B or release 304C query parameters, but may also indicate a specific segment of the source code. For instance, a user may wish to know a quality metric for lines 1-100 of the source code for the second release of build #4323. This may facilitate a more filtered search process for a response to the query. A query need not include a query parameter if it is not relevant. For example, a query of "who is the author of TestSoftware 2.0?" may not include query parameters of build ID 304B, stage 304C, quality metric 304D, etc.

Thus, the NLP system 114 may use its library of tools and stored data and language recognition functionalities to identify and determine a query from the received input. Examples of the NLP system's functionalities may include, but are not limited to: syntax recognition (e.g., grammar induction, lemmatization, morphological segmentation, part-of-speech tagging, parsing, sentence breaking, stemming, word segmentation, terminology extraction, etc.); semantics recognition (e.g., lexical semantics, machine translation, named entity recognition (NER), natural language generation, natural language understanding, optical character recognition (OCR), question answering, textual entailment recognition, relationship extraction, sentiment analysis, topic segmentation, word sense disambiguation, etc.); discourse analysis and summarization; and audio speech recognition and segmentation.

At step 306, the query/response system 110 may determine whether the identified query is an appropriate form. In one aspect, form appropriateness may be the degree to which one or more components of the query/response system 110 (e.g., the AIML interpreter) may be able to execute commands based on the query alone. The commands may include searching for or generating a response to the identified query. Furthermore, a query may not be in form if there are issues with syntax, semantics, and/or the discourse of the query, as identified by the tools and functionalities of the NLP system 114 described above. If the query is not in form, the query may be reformatted and/or rephrased (e.g., as in step 308). This may be performed by the NLP system (e.g., via the pre-processor 116A) and/or the calibrator 126 (e.g., to solicit a specific or better response). Also or additionally, the user may be prompted to reformat or rephrase the query.

In another aspect, the query may be deemed appropriate based on user input. For example, the user may be notified on the query response UI 216 by a prompt to confirm an identified query, e.g., "Are you asking to know the status of build #4232? Select Yes or No."

If the query is in an appropriate form, the query response system predict a response type (e.g., as in step 310). For example, the query response system 110, via its query engine 112, may determine whether the response would be a static response or a dynamic response (e.g., as in step 312). A query may solicit a static response if the response may be easily identified or retrieved, e.g., from a local storage 124. A dynamic response, however, may involve the query response system 110 to communicate with the DevOps system 130 to determine a response to the query. In some implementations, a determination of whether a query solicits a static or dynamic response may involve determining whether the response being solicited is stored in a memory that may be of fixed size and constant (e.g., static memory) or if it is stored in a memory that is otherwise (e.g., dynamic memory). In further implementations, a determination of whether a query solicits a static or dynamic response may involve determining whether the information being solicited is likely to change within a threshold time or frequency, or whether the information is likely to remain constant over the threshold time or frequency. For example, a query asking who the author of an application is may receive a static response where as a query seeking the trend in a quality metric of the application over a recent time may receive a dynamic response.

If the response type is static, step 314 may include searching within a local database 122, e.g., of the AIML interpreter 122. As discussed above, the database 124 may be periodically updated based on events taking place across the various DevOps tools 138A-138E for each application development. In some aspects, information from previously generated dynamic responses may be used to further update the database 124 for a given application development. Data stored within database 124 may be associated with specific application developments, which may be identified by the application ID. Thus, the AIML interpreter 122 may use information extracted from the identified query (e.g., application ID, aspect, etc.) to "look up" a response to the query in the database 122. In some aspects, the response may involve a more active search. For example, the AIML interpreter may periodically generate and store new data pertaining to application developments using already stored data, using AIML. Thus, the AIML interpreter 122 may perform an active search for the response to the query based on the knowledge base built using AIML data.

At step 316, the AIML Interpreter 122 may set up a proposed response based on the above-described search. The proposed response may be further investigated (e.g., as described in method 300C) and may be processed (e.g., by the post processor 116B of the NLP system 114) for presentation to a user device 102A-102C. If the search was unsatisfactory, or a response cannot be found, the AIML interpreter may indicate an "out-of-bound" response, which may prompt the query/response system to calibrate the query.

If, at step 312, the query/response system 110 determines that the query solicits a dynamic response, one or more steps of method 300B may be performed, e.g., as illustrated in FIG. 3B. One or more steps of method 300B may be performed by the DevOps system 130, or may be facilitated by the query/response system 110 to be performed by the DevOps system 130.

As will be discussed later, a query may not necessarily solicit a dynamic response. However, the query/response system 110 (e.g., via calibrator 126) may determine from an initially proposed response that a dynamic response is more appropriate for the query. Referring to FIG. 3B, at step 318, the query/response system 110 may establish a connection with the DevOps system 130 (e.g., its main integrator). As was discussed above, the main integrator 132 can manage communications between DevOps tools 138A-138E and one or more external networks or devices (e.g., user device 102A-102E, query/response system 110). The main integrator may be a computing system, plug-in, application program, software, and/or subsystem of the query response system 130 and may include or be associated with the aggregator 134. The aggregator 134, which may be a component of the main integrator, or a standalone system associated with the DevOps system 130 and/or the query/response system 110, may assist in consolidating information received from the different source(s). As discussed above, the source(s) may refer to one or more DevOps tools 138A-138E and/or their respective source integrators 136A-136E. Furthermore, the query/response system 110 may transfer information pertaining to the query request to the DevOps system in order to solicit a dynamic response.

In order to best utilize the DevOps system, it may be useful to know the DevOps tools that would be relevant for determining a dynamic response to the query. Steps 320-328 are examples of methods for identifying relevant DevOps tools. Thus, at step 320, the query/response system 110 and/or the DevOps system (e.g., via the main integrator 132) may determine whether the query involves a DevOps pipeline. If so, a CI server may be identified as a relevant DevOps tool for providing a dynamic response to the query (e.g., as in step 326). For example, step 320 may determine whether the query involves one or more stages, processes, and/or phases of the continuous integrated DevOps process. In some aspects, a query parameter indicating that the query concerns a stage and/or process 304D of the application development may therefore result in a determination that the query involves the DevOps pipeline.

Also or alternatively, at step 322, the query/response system 110 and/or the DevOps system 130 (e.g., via the main integrator 132) may determine whether the query concerns a quality metric. For example, a query that inquires about the performance of a specific build may concern a quality metric. As discussed above, quality metrics may include, but are not limited to an application's performance; efficiency (e.g., code run-time); user feedback; degree of glitches, bugs, or issues; robustness; security; etc.

If the query does concern a quality metric, the query/response system 110 and/or the DevOps system 130 may determine relevant quality assurance (QA) tools associated with the DevOps system 130. These QA tools may assist in generating a dynamic response to the query. The QA tools may include a framework for testing units of code for an application, code coverage tools to find out which parts of the code are tested, analytical tools to help predict vulnerability, and a dashboard to present results of the test to the user. The QA tools may be used to analyze source code, search for defects and bugs, and display results of the search on a dashboard. The QA tools may include a framework or application for testing units of the code (e.g., JUnit in the JAVA™ programming language, JAVA™ Code Coverage (JaCoCo) as a tool for code coverage, and a source code analyzer for statistically analyzing the code base and learning the vulnerability of the standards of usage. Some source code analyzers (e.g., PMD reports) may help find unused variables, empty catch blocks, unnecessary object creation, etc. The statistical analysis may be presented as one or more of a report, spreadsheet, slide, chart, graph, etc. on a dashboard, and may be segregated or divided into many levels. Examples of QA tools that could be used may include, for example, SONARQUBE™ (formerly SONAR™), DYNA- TRACE™ (e.g., for monitoring applications on a server), VERACODE (e.g., for security analysis), WHITESOURCE (e.g., for security analysis), APPSPIDER (e.g., for dynamic testing analysis), JMETER (e.g., for service test analysis), etc.

Also or additionally, step 324 may include identifying any other relevant DevOps tools based on the query parameters. Other relevant DevOps tools may include, for example, compiler tools 138A, other documentation databases, other CI pipelines, other quality assessment tools, project management tools, code editing and/or integrated development environment tools, installation/deployment tools, code management tools, feedback monitoring tools, etc.

It is contemplated that each DevOps tool may not necessarily identify an application, build, and/or release the same way as another DevOps tool, query/response system 110, or the user. For example, while the user may refer to an application as "TestSoftware 2.0", a DevOps tool may only identify that application as a string "xxxxxxxxx." It may be helpful for a documentation database to provide a mapping of the identifiers that various entities use (e.g., DevOps tools, query/response system 110, user device 102A-102C, etc.) to refer to the same application, build, and/or release. Thus, for each identified DevOps tools from steps 320-328, the query/response system 110 and/or the DevOps system (e.g., via the main integrator 132) may determine alias identifiers from a documentation database (e.g., as in step 330). The identified DevOps tools may include, for example, CI servers, QA tools, and any other DevOps tools based on the query parameters. An example of a documentation database that can provide the mapping of the various alias identifiers is MongoDB™.

Step 332 may include facilitating a connection with the source integrator(s) of the identified relevant DevOps tools. The connection may be established between the source integrators 136A-136E and the main integrator 132. Also or alternatively, the connection may be established between the query/response system (e.g., at the AIML interpreter 122) and the source integrators(s) 136A-136E, via the communications network 104. The connection may enable the source integrators to input a reply to the query (e.g., as in step 334). Queries may include, for example, a status of a build, a status of a deployment, or information pertaining to an event occurring in the DevOps pipeline. Depending on the query and the query parameters, the reply may be an indication of a status (e.g., pending, completed, not started, passed, failed, etc.), a value (e.g., 90% for a specified quality metric), a description, a code sequence, an execution of a build, temporal or geographical information (e.g., testing completed on Jan. 1, 2015 in XYZ server located in X latitude and Y longitude), identification (e.g., of servers, applications, builds, testing environments, etc.), or a combination thereof. For example, a query and/or response may include, e.g., initiating a deployment, requesting a JUNIT coverage, requesting a test status, etc.

Step 336 may include enabling integration and consolidation of the replies (e.g., via the main integrator and the aggregator) into a dynamic response. In some implementations, each of the source integrator(s) for the relevant DevOps tools may communicate with one another to coordinate replies. For example, for a query such as "What is the history of TestSoftware 2.0's development?", the source integrator(s) of tools for each stage of the DevOps pipeline may provide the status and temporal information of when each of tools worked on the TestSoftware 2.0's development. By consolidating the status and temporal information from each stage of the DevOps pipeline, the main integrator and aggregator may effectively present a timeline of TestSoftware 2.0's development across the stages of the DevOps pipeline.

As was described above, the main integrator 132 can manage communications between the DevOps tools 138A-138E and/or their respective source integrators 136A-136E, and the query/response system 110 via the communications network 104. An aggregator 134 may assist in consolidating information received from the different source integrators 136A-136E. For example, after a query is received from the query/response system 110, the aggregator may receive the responses from the various source(s) that are relevant for the query, and may consolidate the responses into a unified response (e.g., as in step 336). The unified dynamic response may be sent to, and received by, the query response system 110 via the communications network 104 (e.g., as in step 338). There, the response may be finalized based on one or more steps as depicted in FIG. 3C.

Referring now to FIG. 3C, method 300C presents exemplary steps for finalizing a response before presentation to the user device 102A-102C. The steps may be performed by various components of the query/response system 110. Method 300C may initiate after receiving a proposed response. The proposed response may be a static response, as prepared by the AIML interpreter 122 in step 316, or a dynamic response, as prepared by the DevOps system 130 (e.g., by the main integrator 132 and/or aggregator 134 in step 336).

At step 338, the query response system 110 may determine whether the received response would be the most appropriate response (e.g., if there is a possibility for a better response to the query). This step may be performed by the calibrator 126 in conjunction with the NLP system 114. For example, the calibrator may decide whether a better static response could be made if the query was rephrased and presented to the AIML Interpreter 122 (e.g., for a static response) or the DevOps system 130 (e.g., for a dynamic response). In some aspects, the determination of whether it is a desired or an appropriate response may be based on user input from user device 102A-102C, e.g., via a human interface supported by the AIML interpreter 122. In some implementations, the determination of appropriateness (e.g., "validation") may be based on a predetermined threshold validity metric. The validity metric may be based on past data of similar queries, and the responses that were provided, and judged by a user to be satisfactory. The validity metric may be a score based on a multitude of factors including, but not limited to, whether the response addresses each of the query parameters identified in the original query, whether it is of a sufficient length, whether it is based on current data, whether the response has sufficient details, etc.

If there is a possibility for receiving a better response. The calibrator may coordinate with the NLP system 114 (e.g., via its pre-processor 116A) to reformat the query. In some aspects, if the query was nevertheless deemed to have been appropriate, the calibrator 126 may direct the NLP post processor 116B to finalize the response to the query. For example, the post processor 116B may correct a proposed response, e.g., by rephrasing and correcting grammatical mistakes.

In some implementations, e.g., where a query solicits multiple responses, the query/response system may run each response through the calibrator 126 and aggregate the responses (e.g., as in step 342). The aggregation may occur with the help of an aggregator located externally (e.g., aggregator 134) or internally within the query/response system 110.

At step 344, the NLP system 114 (e.g., via its post processor 116B) may finalize the aggregated response (e.g., to a natural language query input) so that the finalized response can be delivered to a user device 102A-102C in a desired format. For example, a user may desire to see the response as one or more of a graph, chart, slide, or spreadsheet. Alternatively or additionally, the user may desire a text-based response and/or an audio-based response (e.g., from a chatbot in the query response user interface 216). Furthermore, a user may wish to receive the response in the same format as the query that had been submitted on the query response user interface 216. Like the pre-processor 116A, the post processor 116B may reply on the library 118 and any AI-based tools (e.g., ML tool 120) to perform its functionalities. Thereafter, the final response may be outputted in natural language to the user device 102A-102C (e.g., as in step 346). A user may be able to see an answer to a query he or she posted (e.g., "What is the status of build #4232 of the TestSoftware 2.0 application?") on the query response user interface 216 (e.g., "Build #4232 of the TestSoftware 2.0 application is currently undergoing security testing in server #5432"). In some implementations, the user may be prompted with follow-up queries ("Would you also like to know the status of other builds for TestSoftware 2.0?").

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

What is claimed is:

1. A method comprising:
   receiving, from a database, a response to a request for information associated with a software application development across a development operations (DevOps) pipeline;
   forming a query based on the request, the query comprising an identifier of the software application development and one or more query parameters;
   identifying one or more relevant DevOps tools in the DevOps pipeline based on the query parameters;
   determining, for each of the one or more relevant DevOps tools, an alias identifier for each of one or more of the software application development or query parameter;
   sending, to a source integrator for each of the one or more relevant DevOps tools, a request for an individual response to the query, and the alias identifiers corresponding to the one or more of the software application development or query parameter;
   receiving, from the source integrator and for each of the one or more relevant DevOps tools, the individual response to the query;
   integrating the individual response from the source integrator for each of the one or more relevant DevOps tools into a response to the request;
   validating the response; and
   presenting the response to a user device via a communication network.

2. The method of claim 1, further comprising updating the database by:
   receiving, for each of a plurality of software application developments across a DevOps pipeline, information for one or more events from a plurality of software development tools in the DevOps pipeline; and
   entering, for the plurality of software application developments, the information for the one or more events within data structures associated with the software application development.

3. The method of claim 2, further comprising updating the database by:
   receiving a notification of a new software application development; and
   creating a new data structure using an identifier of the new software application development.

4. The method of claim 1, wherein validating the response comprises:
   determining that the response to the request does not meet a threshold validity metric;
   forming a revised query to send to the database; and
   receiving, from the database, a revised response to the request.

5. The method of claim 1, wherein the first response is an indication that the information requested to be received cannot be found in the database.

6. The method of claim 1, wherein the sending the request for the individual response to the query and the alias identifiers comprises:
   determining that the database does not store the information for the request; and
   sending the query to a second computing device, wherein the second computing device is associated with an integration of a plurality of DevOps tools in the DevOps pipeline.

7. The method of claim 1, wherein the presenting the response to the user device via the communication network further comprises:
   displaying the response to the query on the user interface in a format desired by the user.

8. The method of claim 1, wherein the query parameters include one or more of:
   an identifier of the software application development;
   an identifier of a build of the software application development, an identifier or date of a release of at least a part of the software application development or at least a part of the build;
   a stage and/or process in the DevOps pipeline; or
   a quality metric.

9. An apparatus comprising:
   one or more processors; and
   memory storing computer-readable instructions that, when executed by the one or more processors, cause the one or more processors to:
   receive, from a database, a response to a request for information associated with a software application development across a development operations (DevOps) pipeline;
   generate, using a natural language processing (NLP) application, a query based on the request, the query comprising an identifier of the software application development and one or more query parameters;
   identify one or more relevant DevOps tools in the DevOps pipeline based on the query parameters;
   determine, for each of the one or more relevant DevOps tools, an alias identifier for each of one or more of the software application development or query parameter;
   send, to a source integrator for each of the one or more relevant DevOps tools, a request for an individual response to the query, and the alias identifiers;
   receive, from the source integrator and for each of the one or more relevant DevOps tools, the individual response to the query;

integrate the individual response from the source integrator for each of the one or more relevant DevOps tools into a response to the request;
validate the response; and
present the response to a user device via a communication network.

10. The apparatus of claim 9, the memory storing computer-readable instructions that, when executed by the one or more processors, cause the one or more processors to update the database by:
receiving, for each of a plurality of software application developments across a DevOps pipeline, information for one or more events from a plurality of software development tools in the DevOps pipeline; and
entering, for each of the plurality of software application developments, the information for the one or more events within data structures associated with the software application development.

11. The apparatus of claim 10, the memory storing computer-readable instructions that, when executed by the one or more processors, cause the one or more processors to update the database by:
receiving a notification of a new software application development; and
creating a new data structure using an identifier of the new software application development.

12. The apparatus of claim 10, wherein validating the response comprises:
determining that the response to the request does not meet a threshold validity metric;
forming a revised query to send to the database; and
receiving, from the database, a revised response to the request.

13. One or more non-transitory computer readable media storing instructions that, when executed by one or more processors, cause the one or more processors to:
receive, from a database, a response to a request for information associated with a software application development across a development operations (DevOps) pipeline;
form, using a natural language processing (NLP) application, a query based on the request, the query comprising an identifier of the software application development and one or more query parameters;
identify one or more relevant DevOps tools in the DevOps pipeline based on the query parameters;
determine, for each of the one or more relevant DevOps tools, an alias identifier for each of one or more of the software application development or query parameter;
send, to a source integrator for each of the one or more relevant DevOps tools, a request for an individual response to the query, and the alias identifiers;
receive, from the source integrator and for each of the one or more relevant DevOps tools, the individual response to the query;
integrate the individual response from the source integrator for each of the one or more relevant DevOps tools into a response to the request; and
present the response to a user device via a communication network.

14. The one or more non-transitory computer readable media of claim 13, storing instructions that, when executed by one or more processors, cause the one or more processors to:
receiving, for each of a plurality of software application developments across a DevOps pipeline, information for one or more events from a plurality of software development tools in the DevOps pipeline; and
entering, for each of the plurality of software application developments, the information for the one or more events within data structures associated with the software application development.

15. The one ore more non-transitory computer readable media of claim 13, storing instructions that, when executed by one or more processors, cause the one or more processors to update the database by:
receiving a notification of a new software application development; and
creating a new data structure within a database using an identifier of the new software application development.

16. The one or more non-transitory computer readable media of claim 13, storing instructions that, when executed by one or more processors, cause the one or more processors to update the database by:
determining that the response to the request does not meet a threshold validity metric;
forming a revised query to send to the database; and
receiving, from the database, a revised response to the request.

17. The one or more non-transitory computer readable media of claim 13, wherein the response is an indication that the information requested to be received cannot be found in the database.

18. The one or more non-transitory computer readable media of claim 13, wherein the sending the request for the individual response to the query and the alias identifiers comprises:
determining that the database does not store the information for the request; and
sending the query to the second computing device, wherein the second computing device is associated with an integration of a plurality of DevOps tools in the DevOps pipeline.

19. The one or more non-transitory computer readable media of claim 13, wherein the presenting the response to the user device via the communication network further comprises:
displaying the response to the query on a user interface in a format desired by a user.

20. The one or more non-transitory computer readable media of claim 13, wherein the query parameters include one or more of:
an identifier of the software application development;
an identifier of a build of the software application development, an identifier or date of a release of at least a part of the software application development or at least a part of the build;
a stage and/or process in the DevOps pipeline; or
a quality metric.

* * * * *